US005995110A

United States Patent [19]
Litwinowicz

[11] Patent Number: 5,995,110
[45] Date of Patent: Nov. 30, 1999

[54] METHOD AND SYSTEM FOR THE PLACEMENT OF TEXTURE ON THREE-DIMENSIONAL OBJECTS

[75] Inventor: Peter C. Litwinowicz, Sunnyvale, Calif.

[73] Assignee: Apple Computer, Inc., Cupertino, Calif.

[21] Appl. No.: 08/887,608

[22] Filed: Jul. 3, 1997

Related U.S. Application Data

[63] Continuation of application No. 08/279,206, Jul. 22, 1994, abandoned.

[51] Int. Cl.$^6$ ..................................................... G06T 15/00
[52] U.S. Cl. ................................................ 345/425; 345/429
[58] Field of Search .................................. 345/425, 426, 345/427, 429, 430, 431, 432; 382/285

[56] References Cited

U.S. PATENT DOCUMENTS

| | | | |
|---|---|---|---|
| 4,888,713 | 12/1989 | Falk | 395/125 |
| 5,107,444 | 4/1992 | Wu | 395/119 |
| 5,175,808 | 12/1992 | Sayre | 395/133 |
| 5,187,754 | 2/1993 | Currin et al. | 382/284 |
| 5,255,352 | 10/1993 | Falk | 395/125 |
| 5,325,472 | 6/1994 | Horiuchi et al. | 395/127 |
| 5,369,736 | 11/1994 | Kato et al. | 395/125 |
| 5,404,316 | 4/1995 | Klinger et al. | 364/514 R |
| 5,448,053 | 9/1995 | Rhoads | 250/201.9 |

OTHER PUBLICATIONS

Hall, "Morphing in 2–D and 3–D", Dr. Bobb's Journal, Jul. 1993, v18, n7, p. 18(9).

Moshfeghi et al., "Three–dimensional elastic matching of volumes", *IEEE Transactions on Image Processing*, v.3, No. 2, Mar. 1994, pp. 128–138.

Wolberg, *Digital Image Warping*, IEEE Computer Society Press, 1990, pp. 189–204.

Foley et al., *Computer Graphics: Principles and Practice*, Addison–Wesley Publishing, Inc., 1990, pp. 721–753.

Trevett, N. et al, "Graphics and Imaging Come Together", *Image Processing*, Winter 1990, UK, vol. 2, No. 5, pp. 38–40.

Wyvill, George et al, "Solid Texturing of Soft Objects", *IEEE Computer Graphics & Applications*, Dec. 1987, New York, vol. 7, No. 12, pp. 20–26.

Heckbert, Paul S., "Survey of Texture Mapping", *IEEE Computer Graphics and Applications*, Nov. 1986, New York, vol. 6, No. 11, pp. 56–67.

Rogers, D., *Procedural Elements for Computer Graphics*, McGraw Hill Book Co., 1985, Section 5–11, pp. 354–357.

P. Hanrahan et al, "Direct WYSIWYG Painting and Texturing on 3D Shapes", *Computer Graphics*, vol. 24, No. 4, Aug. 1990, pp. 215–223.

Wolberg, G., *Digital Image Warping*, 1990, IEEE Computer Society Press, pp. 41–45, and 75–81.

Litwinowicz, P. et al, "Animating Images With Drawings", SIGGRAPH 94 Proceedings, pp. 409–412.

*Primary Examiner*—Stephen S. Hong
*Attorney, Agent, or Firm*—Burns Doane Swecker & Mathis, L.L.P.

[57] ABSTRACT

Morphing techniques are employed to enable a user to locally deform a texture image on a three-dimensional object, and thereby align image features in a texture map with geometric features of the object. An affine transformation can be applied to the texture map to provide a rough fit of the texture image to the geometric model. The transformed texture image is placed on the geometric model and the user designates corresponding features on the texture image and the geometric model. Once the designations have been completed, the texture image is warped into a final, deformed image, which is then mapped onto the three-dimensional object. With this approach, the user can apply pre-existing images to three-dimensional models, without being required to repaint any portion of the image.

33 Claims, 11 Drawing Sheets

METHOD AND SYSTEM FOR THE PLACEMENT OF TEXTURE ON THREE-DIMENSIONAL OBJECTS

This application is a continuation of application Ser. No. 08/279,206, filed Jul. 22, 1994, now abandoned.

BACKGROUND OF THE INVENTION

The present invention is directed to the computer generation of images, and more particularly to the placement of texture on three-dimensional objects.

In the generation of images on a computer, it is desirable to place texture on three-dimensional objects, to enhance surface detail. For example, to generate an image of a globe, a map of the world can be placed on a sphere. Similarly, it may be desirable to place a two-dimensional image of a person from a scanned photograph onto a three-dimensional model of a human head.

Generally speaking, the placement of texture from a two dimensional image onto a three-dimensional object involves mapping appearance values from the image to corresponding locations on the surface of the object. Typically, the appearance values represent color, although they can also pertain to other visual aspects, for example surface perturbations such as bumps or the like. If the texture image is specifically designed for the object, the mapping of the appearance values can be carried out in a straightforward manner and produce an acceptable result. Where the texture image and the three-dimensional object are created independently of one another, however, a direct mapping from the texture image onto the surface of the object may not result in the desired effect. For example, if a scanned photograph of an animal is mapped onto a three-dimensional model of that animal, the size and/or orientation of the animal in the photograph may not correspond with those of the model. In such a case, the texture image must be revised to fit onto the model.

In one approach to this problem, the texture image is globally manipulated by applying user-designated offsets, rotation and scaling. Examples of this approach are described in Rogers, D., *Procedural Elements for Computer Graphics*, McGraw Hill Book Co., 1985, Section 5-11, pp. 354–355. The purpose of this global manipulation is to resize and reorient the texture image to provide a good fit with the surface of the model. The manipulated texture image is then applied to the three-dimensional model. This approach does not assure that all of the features in the texture image will be aligned with corresponding features on the three-dimensional model, however. For example, if a texture image of a person's face is manipulated so that, overall, the face fits onto a three-dimensional mask, individual features of the face, such as the eyes or the mouth, may not line up exactly with corresponding features on the mask. In such a case, the user may be required to manually repaint portions of the texture image, until the features match. This painting of the image is carried out in a separate two-dimensional window, rather than on the three-dimensional object itself. As a result, this procedure can be tedious, since the changes that need to be made are not always apparent to the user.

In an alternative approach, texture can be painted directly onto the surface of the three-dimensional object. An example of this approach is described in P. Hanrahan et al, "Direct WYSIWYG Painting and Texturing on 3D Shapes", *Computer Graphics*, Vol. 24, No. 4, August 1990, pp. 215–223. While this technique is useful, it requires painting skills on the part of the user. Furthermore, it does not facilitate the application of pre-existing textures to a new model.

Accordingly, it is desirable to provide a technique which allows users to apply previously scanned or painted images to three-dimensional models, without the need to repaint any portion of the image to align particular features in the texture and the model.

BRIEF STATEMENT OF THE INVENTION

In accordance with the present invention, image warping or "morphing" techniques are employed by a user to locally deform an image on a three-dimensional object, and thereby align features in a texture image with geometric features of the object. In the implementation of the invention, an affine transformation can be first applied to the texture map to provide a rough fit of the texture map to the geometric model. The transformed texture image is placed on the geometric model and the user then designates corresponding portions of the texture image and the geometric model. Once the designations have been completed, the transformed texture image is warped into a final, deformed image, which is then mapped onto the three-dimensional object.

With this approach, the user can apply pre-existing images to three-dimensional models, without being required to repaint any portion of the image. The user is not required to work on an untextured object to do so. Rather, the interaction between the user and the image is carried out by dragging texture in an interactive fashion.

Further features of the invention, as well as the advantages offered thereby, are explained in detail hereinafter with reference to specific embodiments of the invention illustrated in the accompanying drawings.

DETAILED DESCRIPTION

The present invention is directed to the generation of images in a computer, for display on a display device, such as a monitor, and/or printing in a document. While the particular hardware components of a computer system do not form a part of the invention itself, they are briefly described herein to provide a thorough understanding of the manner in which the features of the invention cooperate with the components of a computer system to produce the desired results.

Figure 1:
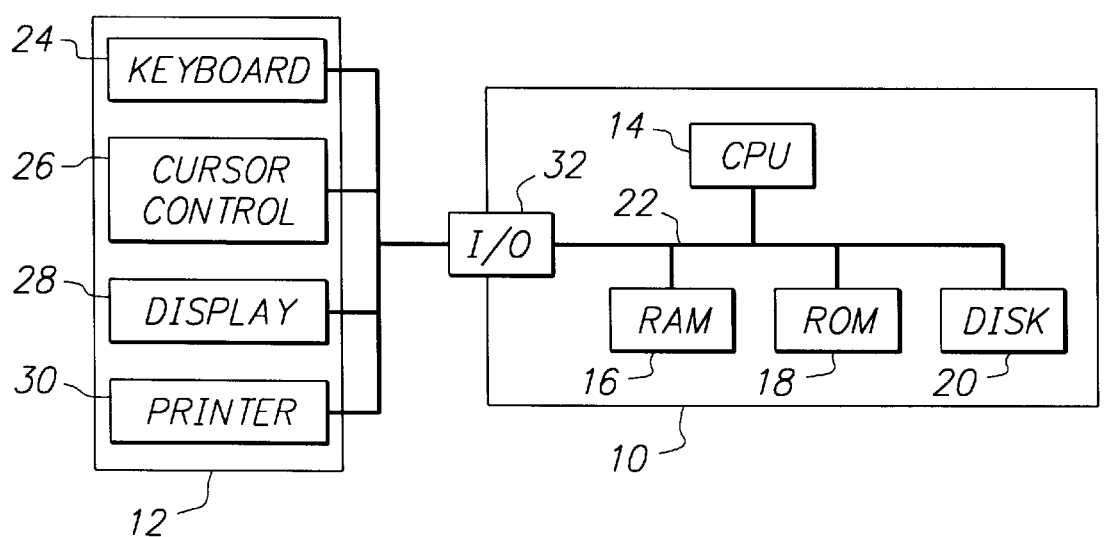
FIG. 1 is a block diagram for a general computer system of the type in which the present invention can be implemented.

Referring to FIG. 1, the computer system includes a computer 10 having a variety of external peripheral devices 12 connected thereto. The computer 10 includes a central processing unit 14 and associated memory. This memory generally includes a main memory which is typically implemented in the form of a random access memory 16, a static memory that can comprise a read only memory 18, and a permanent storage device, such as a magnetic or optical disk 20. The CPU 14 communicates with each of these forms of memory through an internal bus 22. The peripheral devices 12 include a data entry device such as a keyboard 24, and a pointing or cursor control device 26 such as a mouse, trackball, pen or the like. A display device 28, such as a CRT monitor or an LCD screen, provides a visual display of the information that is being processed within the computer, for example the contents of a document or a computer-generated image. A hard copy of this information can be provided through a printer 30, or similar such device. Each of these external peripheral devices communicates with the CPU 14 by means of one or more input/output ports 32 on the computer.

Figure 2:
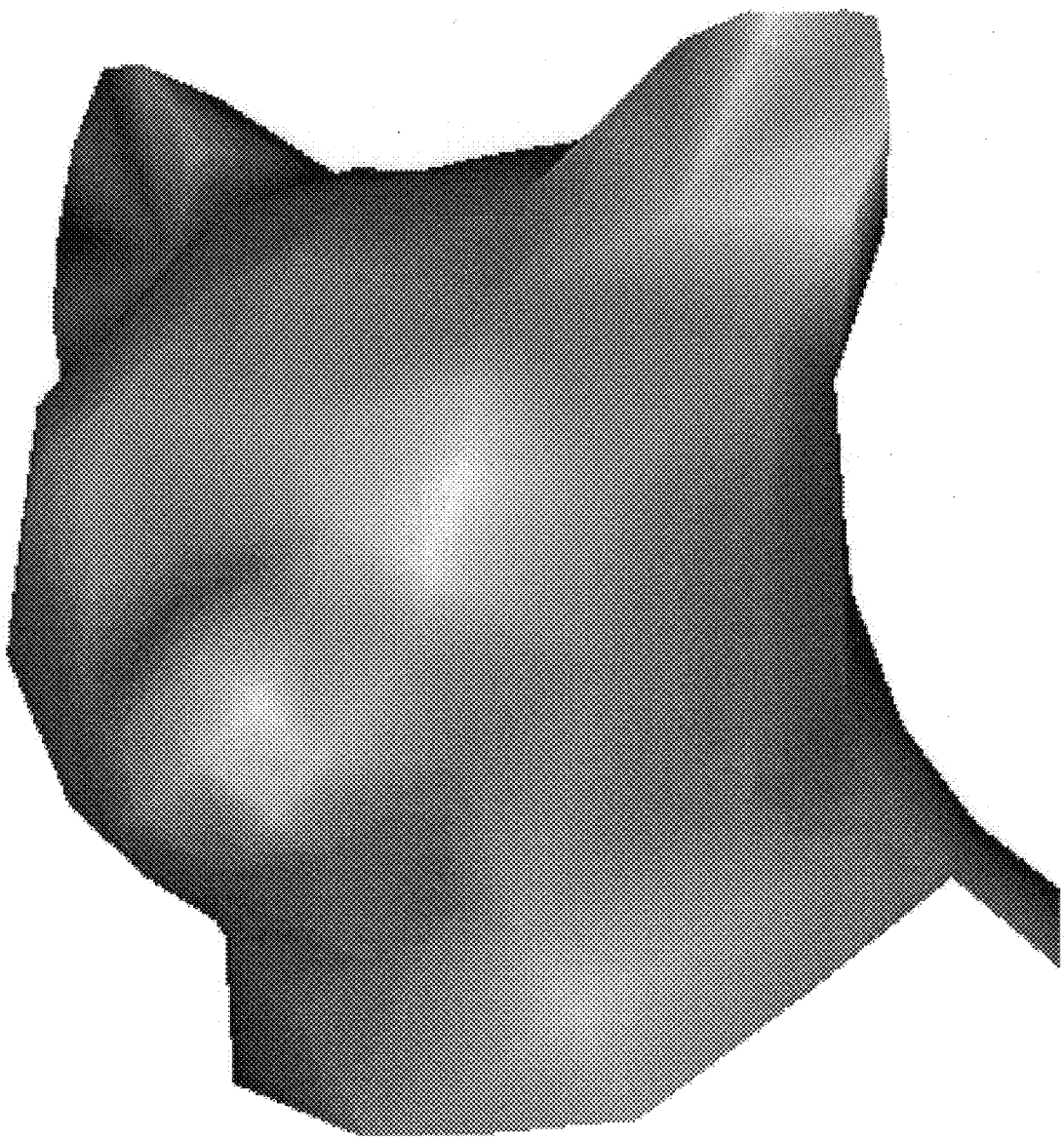
FIG. 2 is an illustration of a three-dimensional object.
Figure 3:
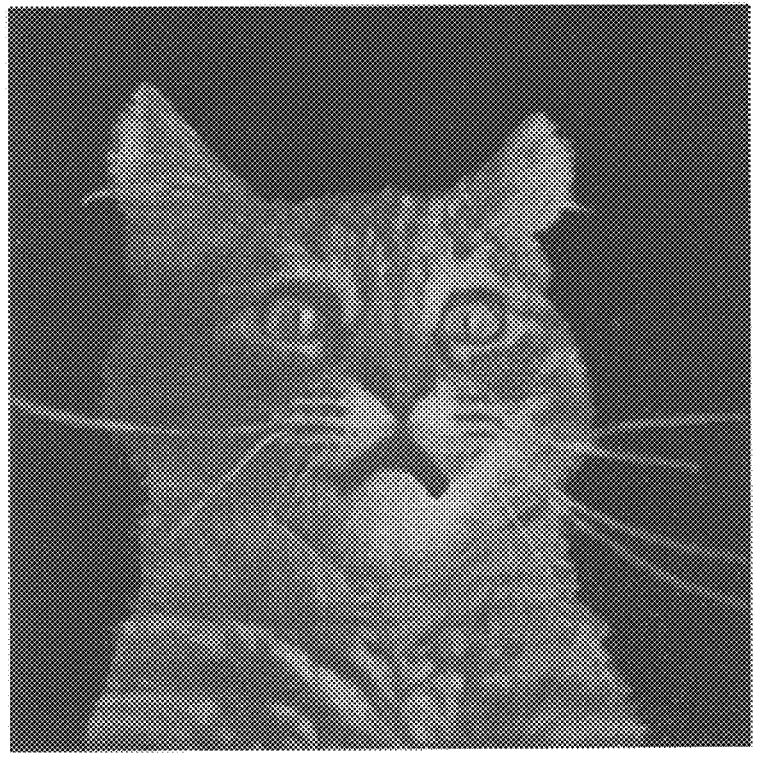
FIG. 3 is an illustration of a texture image, comprising a picture of an animal.

To facilitate an understanding of the principles which underlie the present invention, it will be described hereinafter with reference to a particular example in which a texture image of a cat's face is placed on a three-dimensional model of a cat's head. An example of a suitable three-dimensional model is depicted in FIG. 2, and the two-dimensional texture image is shown in FIG. 3. In this particular example, the texture image of FIG. 3 is a scanned photograph. It will be appreciated, however, that images derived from other suitable sources, such as those generated with painting and drawing programs, can also be used.

Figure 5:
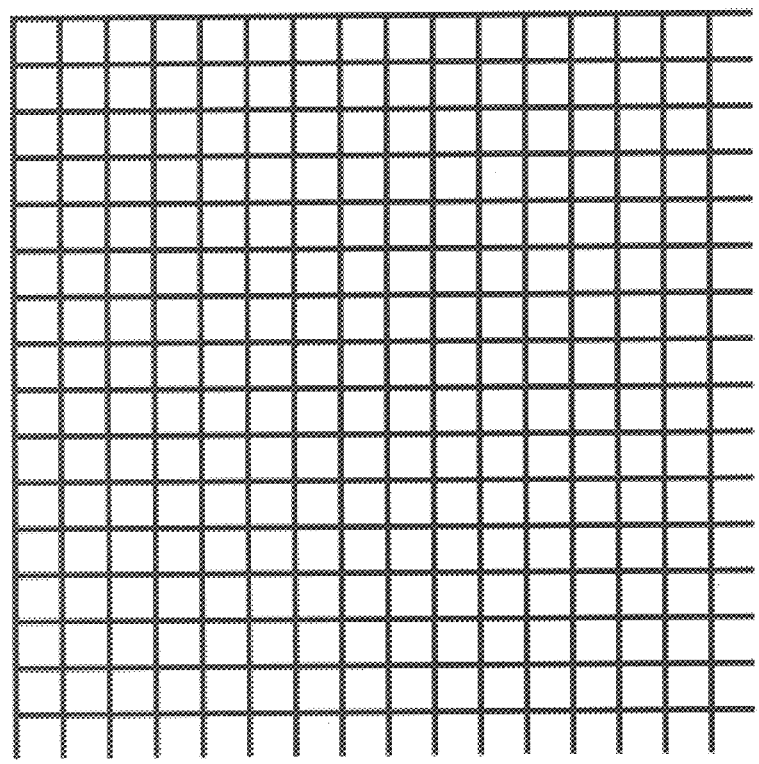
FIG. 5 is the UV parameterization grid for the texture image.
Figure 4:
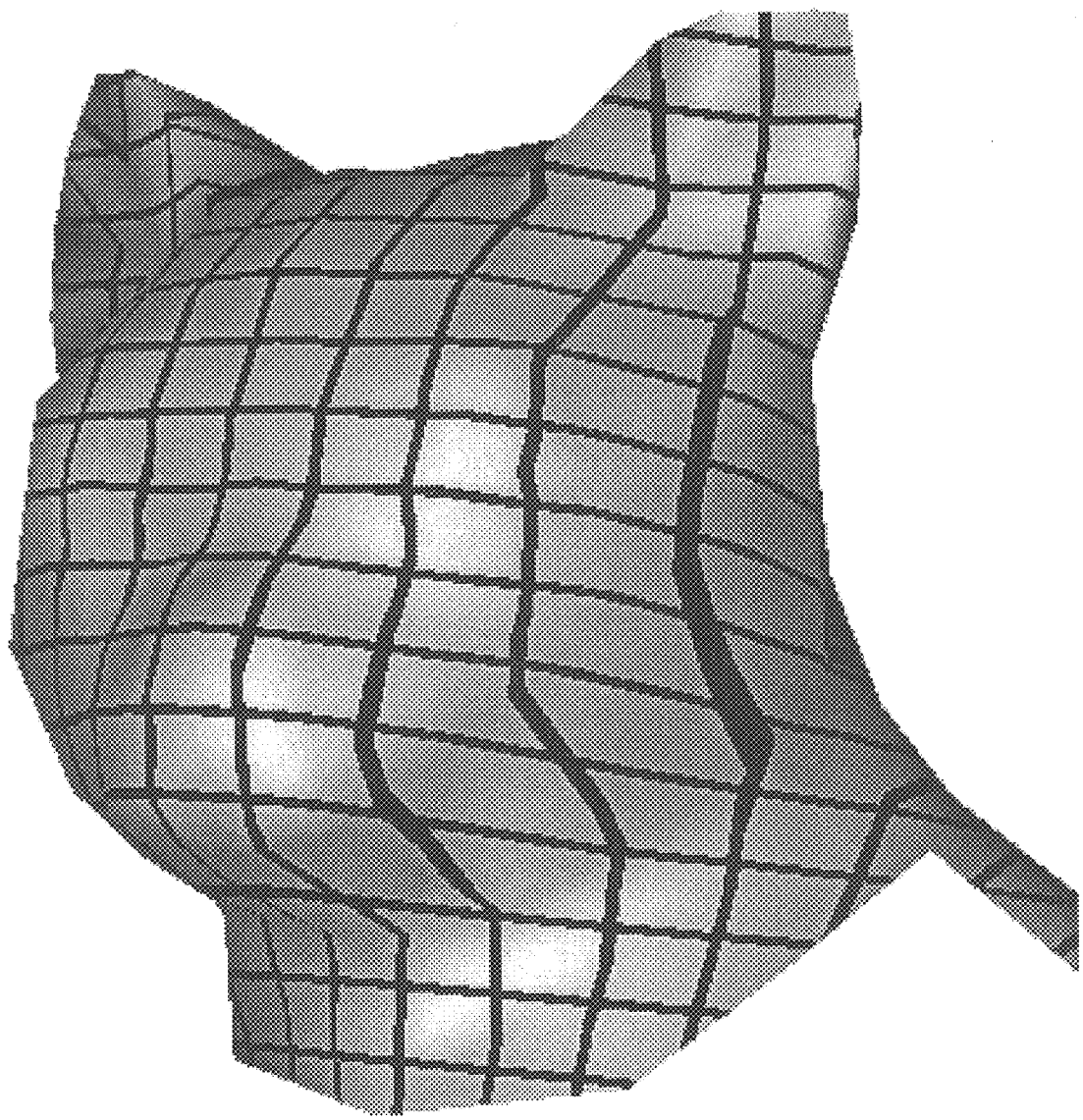
FIG. 4 is another illustration of the three-dimensional object, with a UV parameterization grid overlaid on its surface.

Each of the three-dimensional surface and the texture image can be characterized by UV parameters. In essence, locations on the three-dimensional surface and within the texture image are specified according to their position in a UV coordinate space. FIG. 4 illustrates the three-dimensional object of FIG. 2 with a UV coordinate grid overlaid on its surface. FIG. 5 illustrates the UV coordinate grid for the texture image of FIG. 3. Each location on the surface of the three-dimensional object and in the texture image can be represented by three parameters, namely its U coordinate, its V coordinate and a display value. For the three-dimensional object, its display value can be an illumination brightness that represents the light and shaded portions of the surface, as determined by a light source located at an arbitrary position. If it is assumed that the light source remains fixed relative to the object, these values can be precomputed and stored in a buffer contained within the memory 16 of the computer system.

For the texture image, the display values can represent texture color or other texture parameters, such as displacement vectors or normal surface perturbations. In the following description, only color will be referred to as the display value, although it will be appreciated that other characteristics can be taken into account as well. Again, these display values can be stored in a memory buffer, along with the associated U and V coordinate values.

To apply the texture image to the three-dimensional surface, the display value, e.g. color, for each U,V location in the texture image is mapped to a corresponding U,V location in the coordinate space of the three-dimensional model. The resulting display value is determined by multiplying the illumination brightness for the object surface by the texture color for the texture image. These values are used to control the individual pixels in a display device, e.g., the computer monitor 28, for display of the resulting image.

Figure 6:
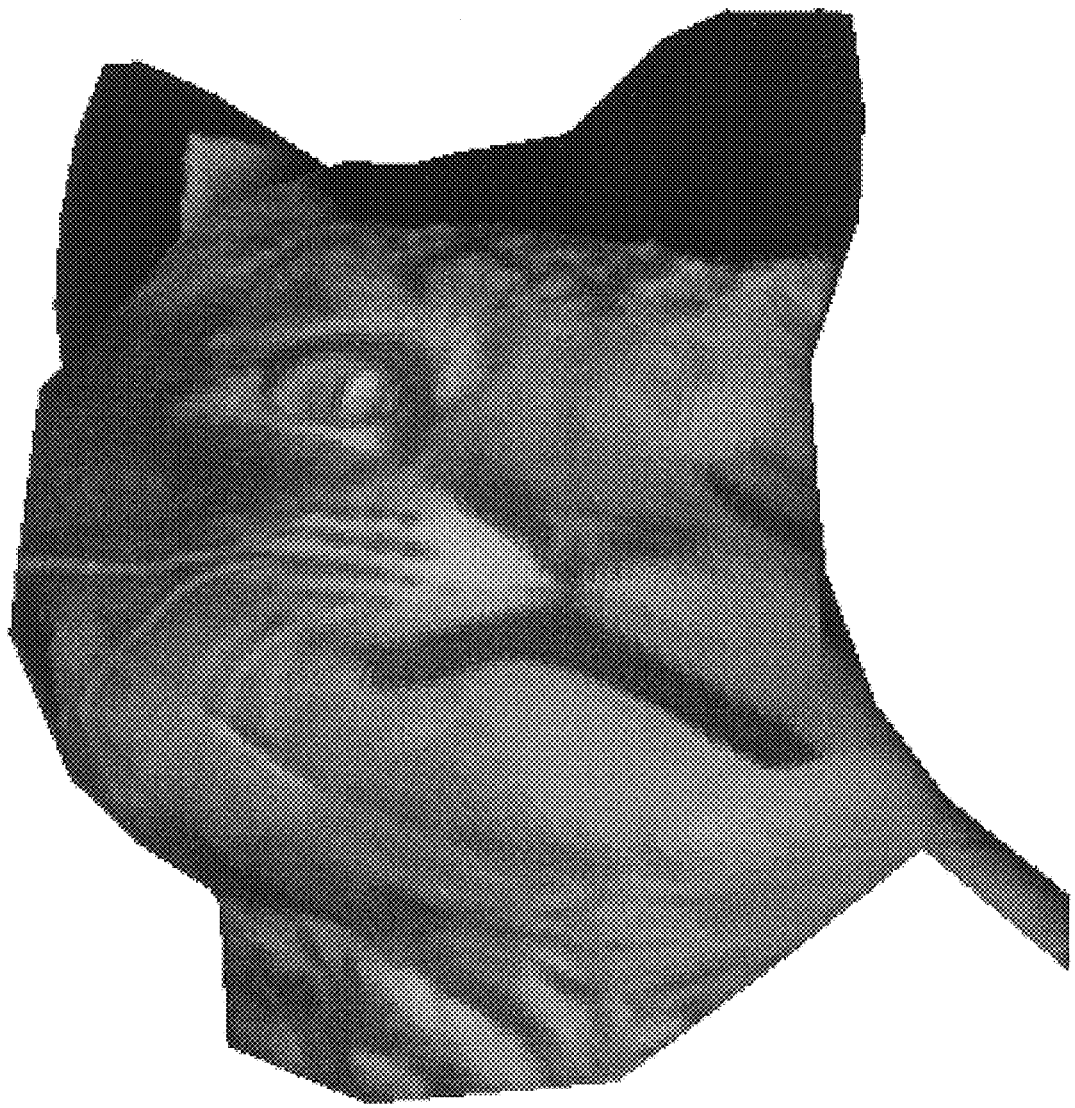
FIG. 6 is an illustration of a direct mapping of the texture image of FIG. 3 onto the object of FIG. 2.

FIG. 6 illustrates the result of a direct one-to-one mapping of the texture image of FIG. 3 onto the surface model of FIG. 2. As can be seen, the image of the cat's face does not fit properly on the model. This is due to the fact that the texture image, i.e. the photograph of the cat, was created independently of the three-dimensional model. To correct for differences in the size and/or shape of the texture image relative to the geometric model in this type of situation, an affine transformation can be applied to the texture image. In essence, an affine transformation comprises any combination of rotation, scaling and translation of the texture image. In the specific example illustrated in FIGS. 2 and 3, it is desirable to enlarge and rotate the image so that the area of the face corresponds to the size and position of the object. To do so, the user can place the texture image on the object and interactively designate the appropriate scaling, rotation and translation that cause the desired portion of the texture image to fit into the corresponding portion of the object, as described in the previously cited reference by D. Rogers.

Figure 7:
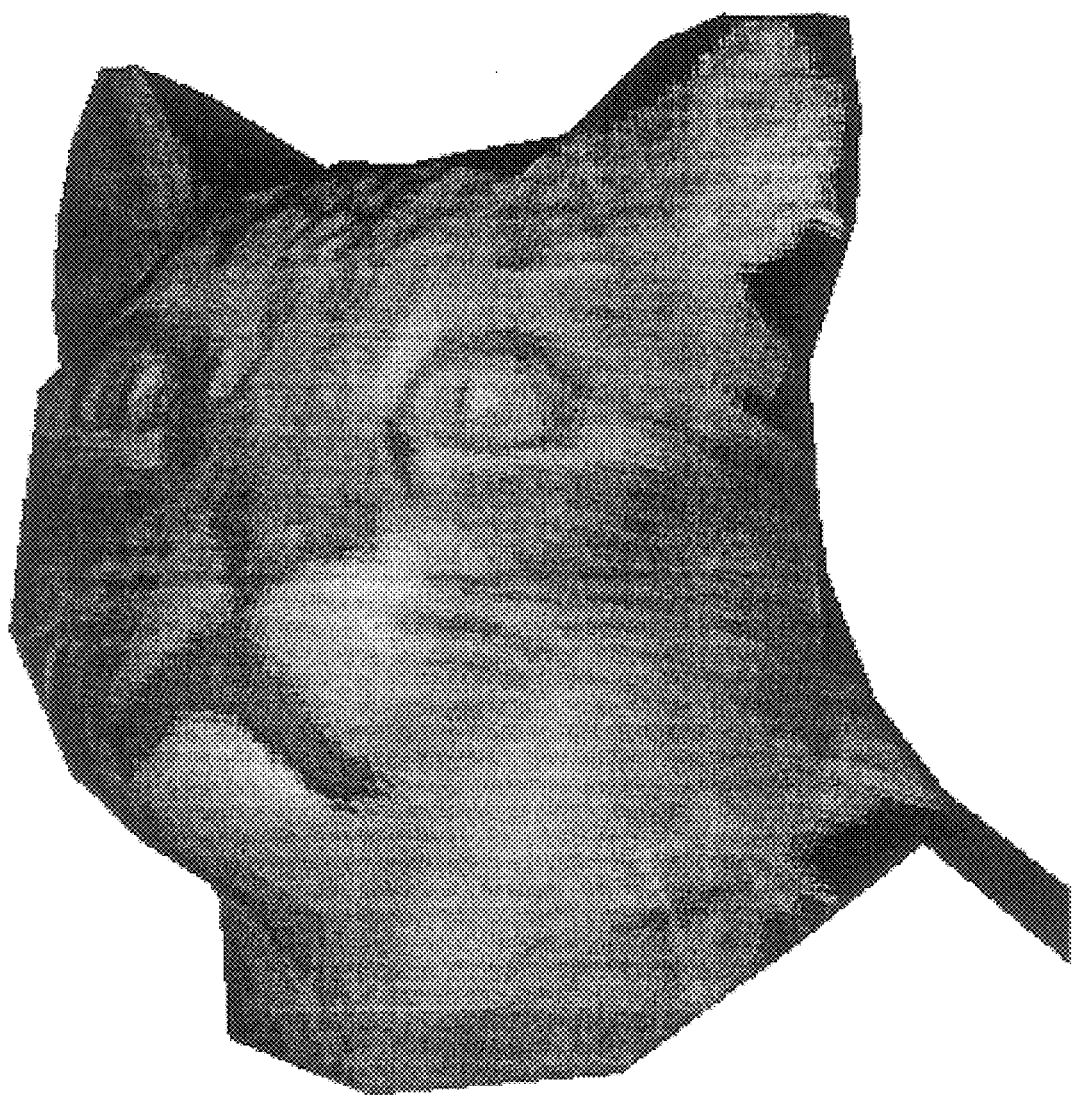
FIG. 7 is an illustration of an affine transformed version of the texture image of FIG. 3 mapped onto the surface of the three-dimensional object.

When this transformed image is applied to the three-dimensional model, the results are as shown in FIG. 7. As can be seen therefrom, the overall size and orientation of the texture image corresponds to that of the three-dimensional model. However, individual features within the image do not match the corresponding features in the model. For example, the cat's nose is not shown at the proper location on the object. Similarly, the shapes of the ears do not match those on the object.

In the past, in order to correct for misalignment between the texture image and the three-dimensional surface, it was necessary to repaint portions of the texture image. For example, using a painting program, the position of the cat's nose could be moved to the left, until it coincided with that of the object. Similarly, the shapes of the ears could be changed with the painting program.

In accordance with the present invention, however, the need for painting to align features of the texture image with those on the three-dimensional surface can be avoided, by using image warping techniques of the type conventionally applied to two-dimensional images. To do so in the context of the invention, the user designates featured on the original texture image. This can be done with the cursor control device 26 while the image is displayed on the monitor 28. These features can be defined by individual points, lines, splines or regions of the texture image. In the following description, features are designated by points, although it will be appreciated that other delineations of the image can be employed for the same purpose.

Figure 8:
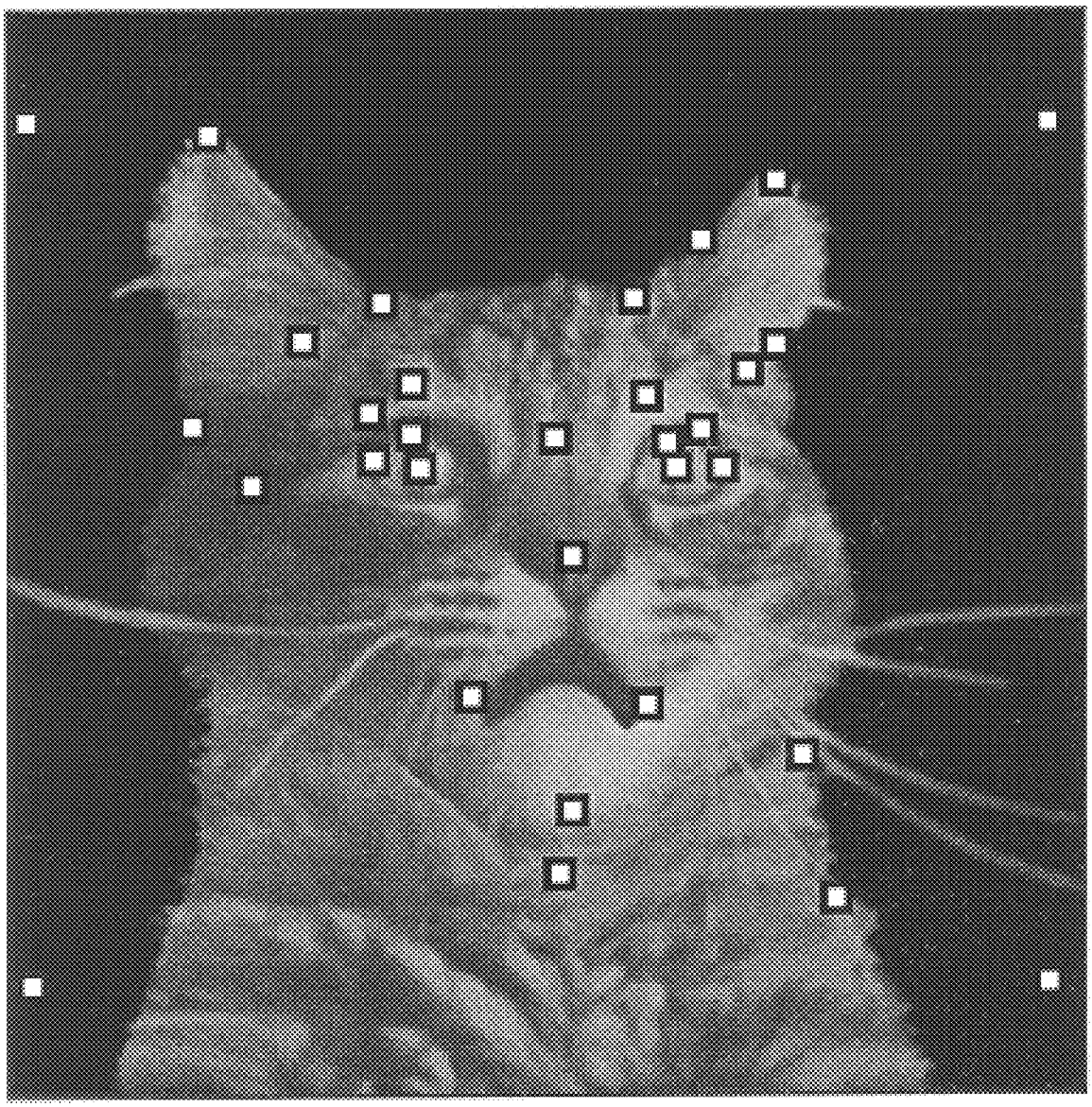
FIG. 8 is another illustration of the texture image of FIG. 3, showing user-designated feature points.
Figure 9:
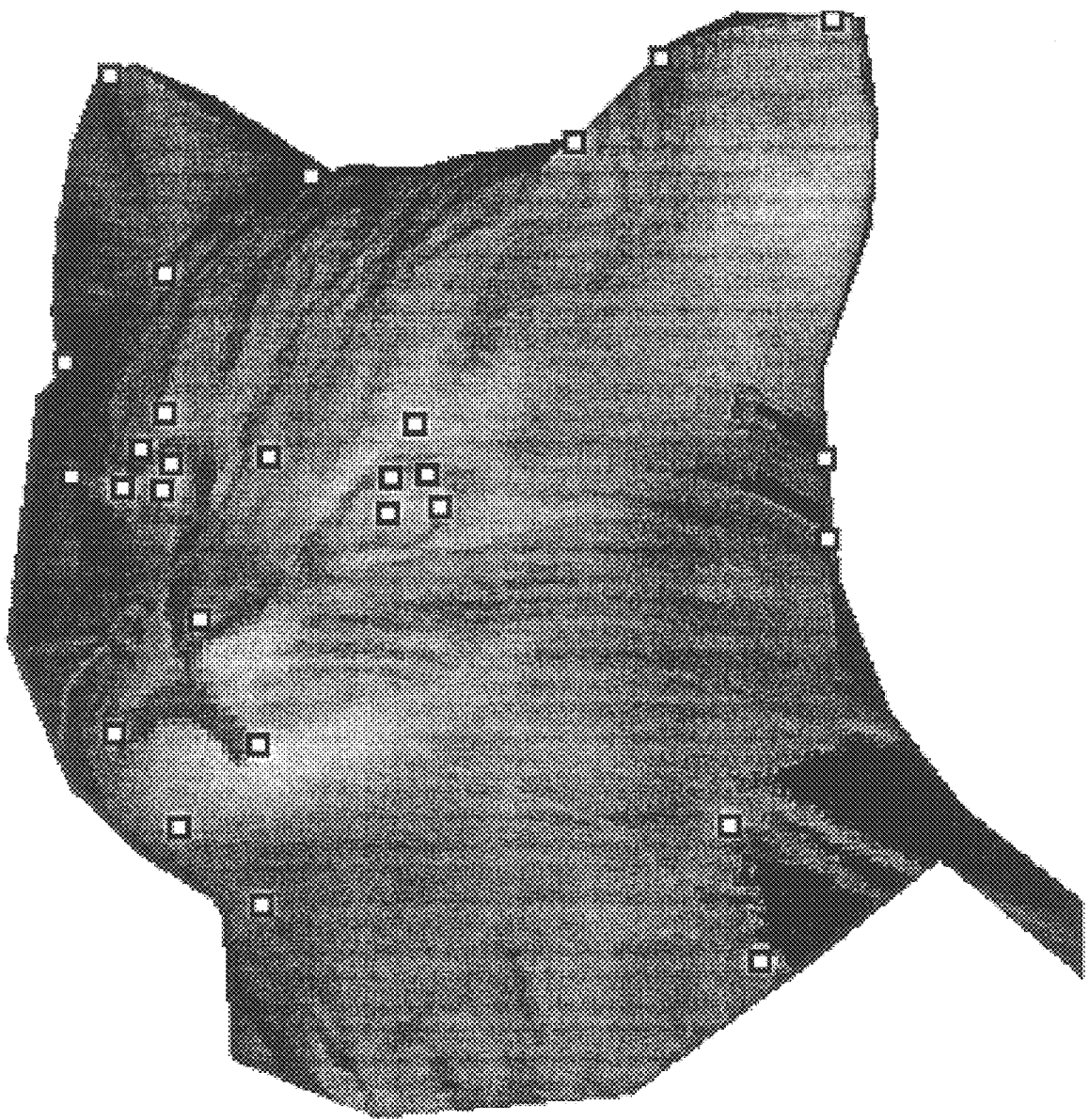
FIG. 9 is an illustration of the corresponding feature points on the three-dimensional surface.

Representative feature points for the texture image are illustrated in FIG. 8. For example, the feature points could comprise the corners of the eyes and mouth, the edges of the ears, and the centers of the nose and forehead. Corresponding feature points are also designated in the coordinate space for the three-dimensional surface, as shown in FIG. 9. Preferably, the texture image and the three-dimensional object are shown side-by-side on the display monitor, to facilitate the user's designation of corresponding features on each. In the example of FIG. 9, the object is shown with the affine-transformed texture image displayed on its surface while the user designates points on the object. If the texture image obscures features on the object, however, it may be desirable to designate the points on the object without the image being displayed thereon. Most preferably, the user can be provided with an option to toggle between the two views, namely the object with the texture image on its surface and without the texture image. Such toggling can be carried out through actuation of a designated key on the keyboard 24, for example.

Figure 10:
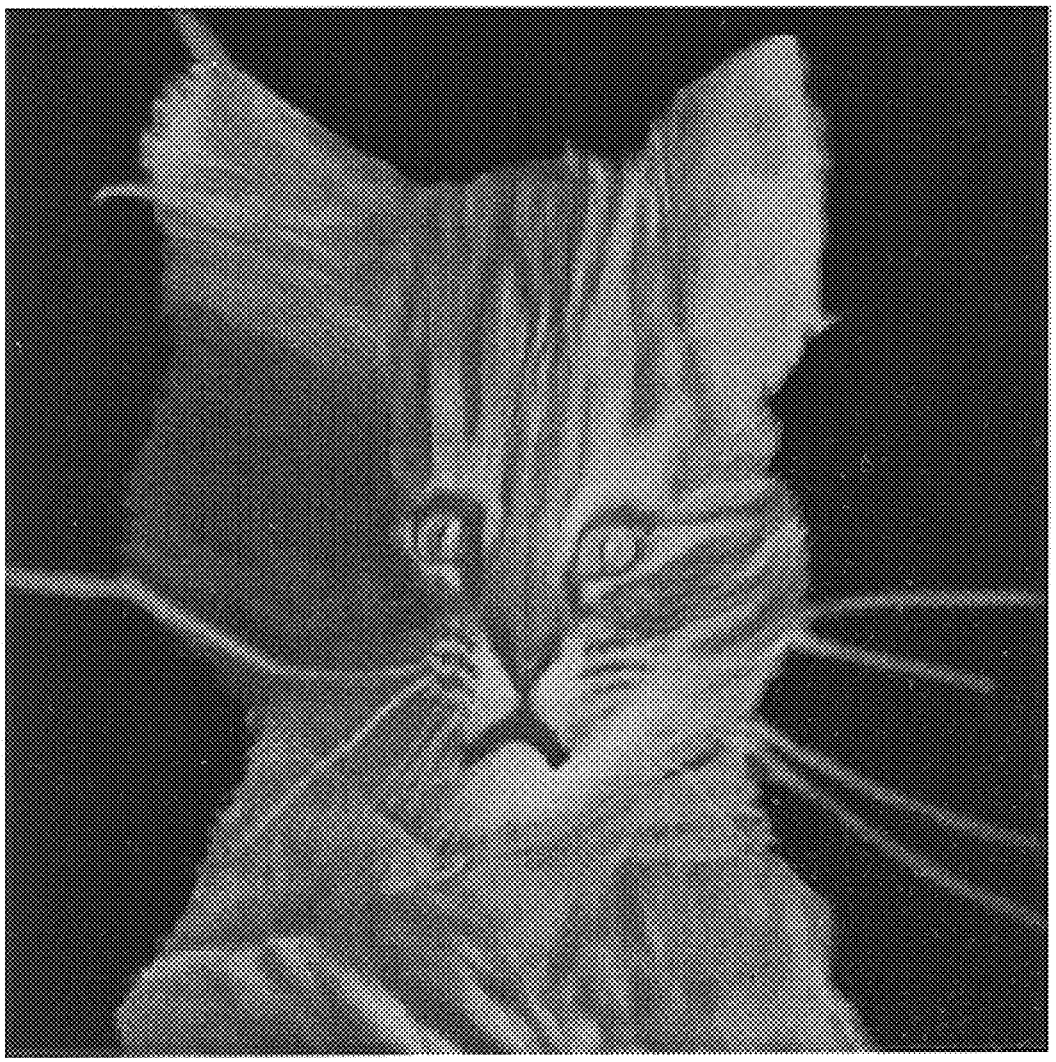
FIG. 10 is an illustration of the warped texture image.
Figure 11:
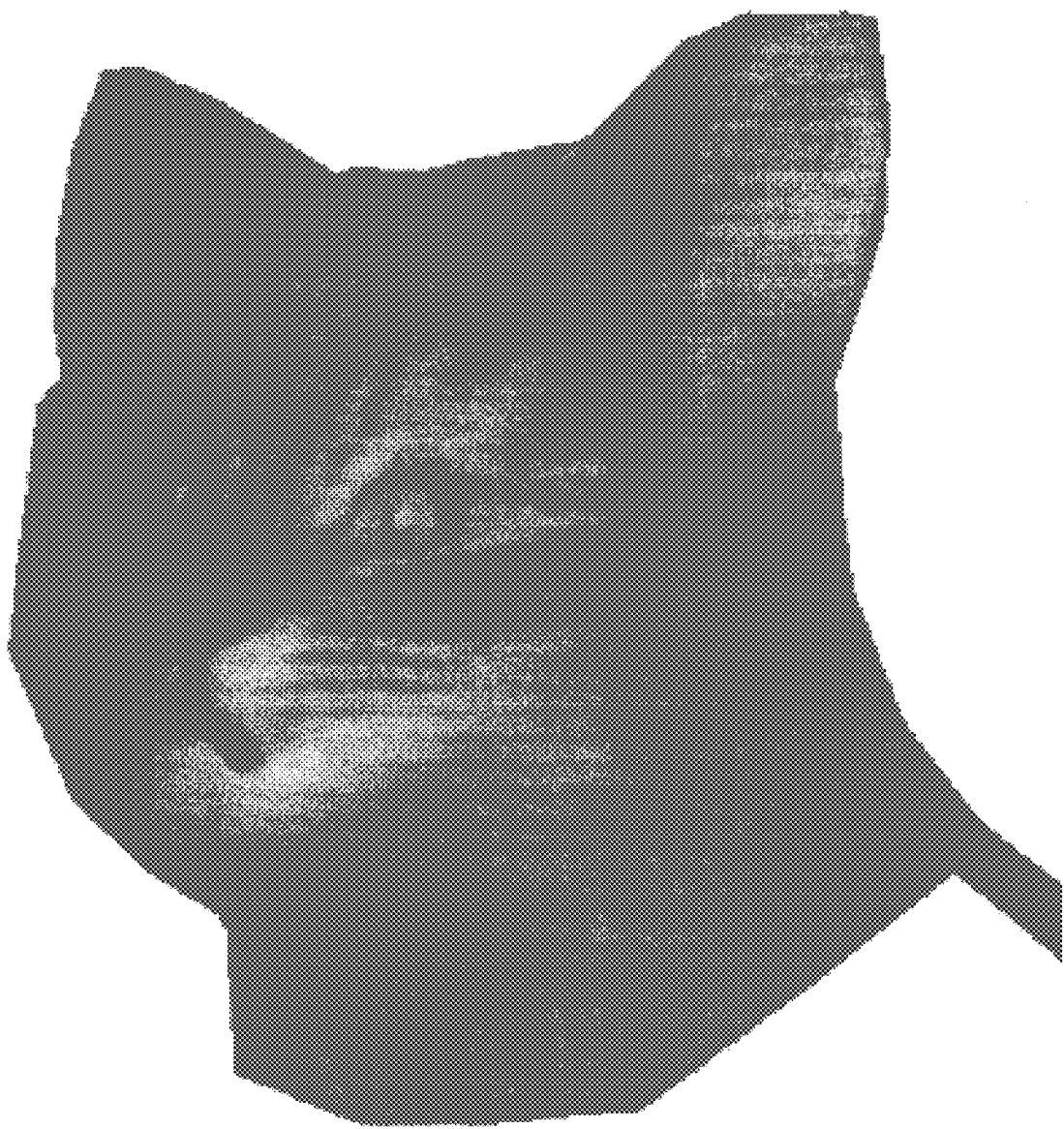
FIG. 11 is an illustration of the warped texture image as mapped onto the three-dimensional surface.

The designated points on the three-dimensional object represent the amount of displacement that is needed for the corresponding points in the texture image. For example, the user might designate U,V position (1,1) on the texture image, and location (2,3) on the three-dimensional object. These designations indicate that the display value at position (1,1) in the texture image must be displaced one unit in the U direction and two units in the V direction. After the corresponding points are designated on both the texture image and the three-dimensional surface in this manner, the original texture image is warped. In the warping process, the designated points on the texture image comprise source locations, and the corresponding designated points on the object form the respective destination locations. The warped two-dimensional image for the examples of FIGS. 2 and 3 is illustrated in FIG. 10. This warped image can be mapped onto the surface of the three-dimensional object, with the final result as depicted in FIG. 11.

Preferably, the texture image is warped as each pair of corresponding points is respectively designated on the image and the object. In this manner, the user is provided instantaneous, interactive feedback for each designation as it occurs.

Figure 12A:
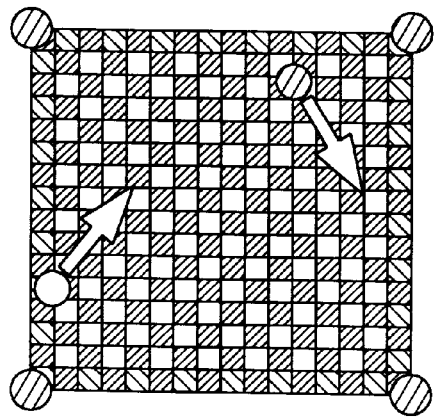
FIGS. 12*a*–12*d* are illustrations of the steps in a warping technique based upon Delaunay triangulation.
Figure 12B:
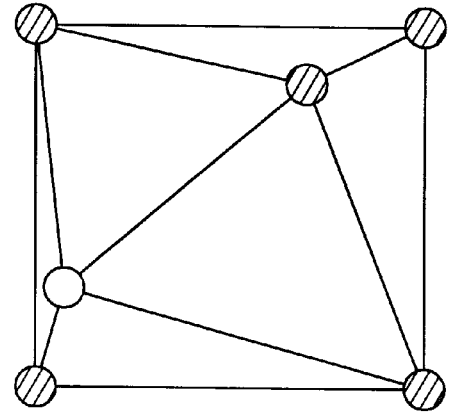

Any suitable warping technique can be employed to conform the texture image to the three-dimensional surface. In one implementation of the invention, Delaunay triangulation can be used to interpolate the displacement of the pixels within the image. An example of this type of interpolation is illustrated with reference to FIGS. 12a–12d. FIG. 12a illustrates a picture of a checkerboard, which defines a texture pattern. Six feature points are defined on this pattern, namely the four corners and two points within the checkerboard, respectively depicted by white and black dots. The Delaunay triangulation can be calculated for these six feature points, and is illustrated in FIG. 12b. Reference is made to F. Preparata et al, "Computational Geometry, an Introduction", Springer Verlag, 1985, for a description of the manner in which the Delaunay triangulation is calculated.

Figure 12C:
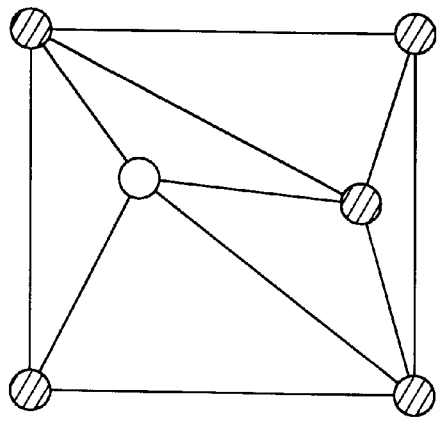
Figure 12D:
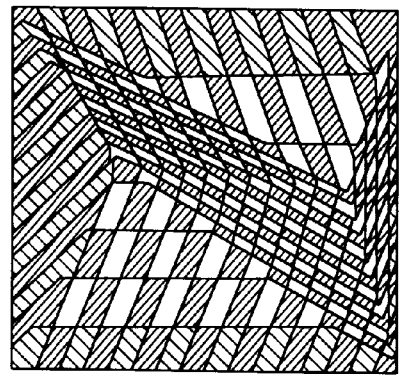

The user can specify that the two internal feature points be moved, as indicated by the arrows in FIG. 12a. Their destination positions are depicted in FIG. 12c. The image is then warped using Delaunay triangulation, for example, as described in Wolberg, G., *Digital Image Warping*, 1990, IEEE Computer Society Press. The resulting warped image is depicted in FIG. 12d.

The Delaunay triangulation provides a rather simple interpolate for the warping technique. As such, it may be suitable for systems where the available processing power is limited. In other environments, where more computing power is available, it may be desirable to use other warping techniques which provide a smoother result. Examples of smoother warping techniques are described in the foregoing article by G. Wolberg, as well as in Litwinowicz, P. et al, "Animating Images With Drawings", SIGGRAPH 94 Proceedings.

From the foregoing, it can be seen that a combination of UV image buffering and image deformation make it possible to warp a texture image directly onto the surface of a three-dimensional object. In practice, the user first designates a feature on the texture image. The user then designates a corresponding feature on the object itself, rather than moving the feature in the image plane as in traditional warping applications. When the user designates the feature on the object, the displacement coordinate for the corresponding feature in the texture image is determined, and the image is warped before being mapped onto the object. In practice, the user can drag a feature around on the surface of the object, and see the resulting texture mapped onto the object at interactive speeds.

It will be appreciated by those of ordinary skill in the art that the present invention can be embodied in other forms without departing from the spirit or essential characteristics thereof. For example, warping techniques other than the Delaunay triangulation approach described above can be employed. Similarly, it is not necessary to apply an affine transformation to the texture image prior to warping. Rather, the user can designate corresponding features along the edge of the image and the boundary of the object, for example, to provide an initial fit of the image on the object. The scope of the invention, therefore, is indicated by the appended claims, rather than the foregoing description, and all changes and equivalents that come within their scope are intended to embraced therein.

What is claimed is:

1. A method for interactively placing texture on a geometric surface, comprising the steps of:

defining a texture image and a geometric surface each within a respective coordinate space;

designating corresponding features on each of the texture image and the geometric surface;

warping the texture image so that the designated features on the image are located at the same positions within the coordinate space of the image as the corresponding designated features are located in the coordinate space for the geometric surface;

mapping the warped texture image onto the geometric surface; and controlling a display device in accordance with the mapped image to display a resulting three-dimensional image.

2. The method of claim 1 wherein each coordinate point within the geometric surface has an illumination value and each coordinate point within the texture image has a display value, and wherein said step of mapping comprises multiplying the display value for a coordinate point of the texture image by the illumination value for the corresponding coordinate point of the geometric surface.

3. The method of claim 2 wherein said display value represents color.

4. The method of claim 2 wherein said display value represents a normal surface perturbation.

5. The method of claim 1 wherein said warping step employs Delaunay triangulation to interpolate displacements between corresponding designated points on the texture image and the geometric surface.

6. The method of claim 1 further including the step of globally transforming the texture image to fit it to the geometric surface prior to designating the corresponding features on the texture image and the geometric surface.

7. The method of claim 1 wherein said designated features comprise points on the texture image and the object.

8. The method of claim 1 wherein said designated features comprise lines on the texture image and the object.

9. The method of claim 1 wherein said designated features comprise regions of the texture image and the object.

10. A system for generating an image composed of texture placed on the surface of a geometric object, comprising:
- means for storing a parametric representation of the geometric object;
- means for storing a parametric representation of a texture image;
- means for designating corresponding features on each of the geometric object and the texture image;
- means for determining a displacement value for each pair of corresponding features respectively located on the geometric object and the texture image;
- means for warping the texture image in accordance with said displacement values;
- means for mapping the warped texture image on the surface of the geometric object; and
- means for displaying the mapped image.

11. The system of claim 10 wherein the parametric representation of the geometric object comprises position coordinates with associated illumination values, and the parametric representation of the texture image comprises position coordinates with associated display values.

12. The system of claim 11 wherein said display values represent color.

13. The system of claim 11 wherein said display values represent normal surface perturbations.

14. The system of claim 11 wherein said mapping means includes means for multiplying the display value for a coordinate point of the texture image by the illumination value for a corresponding coordinate point of the geometric object.

15. The system of claim 10 wherein said designated features comprise points on the texture image and the object.

16. The system of claim 10 wherein said designated features comprise lines on the texture image and the object.

17. The system of claim 10 wherein said designated features comprise regions of the texture image and the object.

18. A method for interactively placing texture on a geometric surface, comprising the steps of:
- designating corresponding features on each of a texture image and a geometric surface;
- warping the texture image so that the designated features on the image are located at the same relative positions as the corresponding designated features are located on the geometric surface;
- mapping the warped texture image onto the geometric surface; and
- controlling a display device in accordance with the mapped image to display a resulting multi-dimensional image.

19. The method of claim 18 wherein the geometric surface is defined by illumination values and the texture image is defined by display values, and wherein said step of mapping comprises multiplying the display value for a location on the texture image by the illumination value for a corresponding location on the geometric surface.

20. The method of claim 18 further including the step of transforming the texture image to fit it to the geometric surface prior to designating the corresponding features on the texture image and the geometric surface.

21. A method for generating a multi-dimensional texture image, comprising the steps of:
- selecting a texture image comprising display values in an associated coordinate space;
- selecting a multi-dimensional geometric surface characterized by illumination values in a coordinate space;
- displaying each of said texture image and said geometric surface;
- designating points of correspondence on each of said displayed texture image and said displayed geometric surface;
- warping said texture image so that the designated points on the texture image are located at the same position within the coordinate space of said texture image as the corresponding points within the coordinate space of the geometric surface;
- generating a new image comprising a combination of the warped texture image and the illumination values of the geometric surface; and
- displaying the new image.

22. The method of claim 21 further including the step of performing an affine transformation on said texture image prior to said designating step, to globally fit said texture image to the dimensions of said geometric surface.

23. The method of claim 21 wherein said texture image and said geometric surface are displayed simultaneously.

24. The method of claim 21 wherein the new image is generated by modifying the display values of the warped texture image in accordance with the illumination values of the geometric surface.

25. A system for generating a three-dimensional representation of a two dimensional texture image, comprising:
- a memory storing a two-dimensional texture image and a three-dimensional surface representation;
- a display system which displays each of the two-dimensional texture image and the three-dimensional surface representation stored in said memory;
- a user input mechanism which enables a user to designate points of correspondence on each of the displayed texture image and the displayed surface representation;
- an image warping system which distorts the texture image stored in said memory so that the designated points on said texture image occupy the same geometric relationship as the corresponding designated points on the surface representation; and
- an image generating device for producing and displaying a new image which comprises a combination of said distorted texture image and said three-dimensional surface representation.

26. The system of claim 25 wherein said display system displays said texture image and said surface representation simultaneously.

27. The system of claim 25 wherein said texture image is stored in said memory as display values and said surface representation is stored as illumination values, and wherein said image generating means produces a new image by modifying each display value in accordance with a corresponding illumination value.

28. A computer-readable medium containing a computer program which executes the following steps when loaded into a computer:
- identifying corresponding features on each of a texture image and a geometric surface;
- warping the texture image so that the identified features on the image are located at the same relative positions as the corresponding features are located on the geometric surface;
- mapping the warped texture image onto the geometric surface; and
- controlling a display device in accordance with the mapped image to display a resulting three-dimensional image.

29. The computer-readable medium of claim 28 wherein the geometric surface is defined by illumination values and the texture image is defined by display values, and wherein said step of mapping comprises modifying the display value for a location on the texture image in accordance with the illumination value for a corresponding location on the geometric surface.

30. The computer-readable medium of claim 28 wherein said program executes the further step of transforming the texture image to globally fit it to the geometric surface prior to designating the corresponding features on the texture image and the geometric surface.

31. A computer-readable medium containing a computer program which executes the following steps when loaded into a computer:

displaying each of a texture image comprising display values in an associated coordinate space and a geometric surface characterized by illumination values in a coordinate space;

associating points on said displayed texture image with corresponding points on said displayed geometric surface;

warping said texture image so that said points on the texture image are located at the same position within the coordinate space of said texture image as the corresponding points within the coordinate space of the geometric surface;

generating a new image comprising a combination of the warped texture image and the illumination values of the geometric surface; and displaying the new image.

32. The computer-readable medium of claim 31 wherein said program executes the steps of performing an affine transformation on said texture image prior to said associating step, to globally fit said texture image to the dimensions of said geometric surface.

33. The computer-readable medium of claim 31 wherein said texture image and said geometric surface are displayed simultaneously.

* * * * *

UNITED STATES PATENT AND TRADEMARK OFFICE

CERTIFICATE OF CORRECTION

PATENT NO. : 5,995,110

DATED : November 30, 1999

INVENTOR(S) : Peter C. LITWINOWICZ

It is certified that an error appears in the above-identified patent and that said Letters Patent is hereby corrected as shown below:

On the title page:

In the Title: Delete existing title, insert --METHOD AND SYSTEM WHICH EMPLOY IMAGE WARPING FOR THE PLACEMENT OF TEXTURE ON THREE--.

Signed and Sealed this

Seventeenth Day of April, 2001

*Attest:*

NICHOLAS P. GODICI

*Attesting Officer*  *Acting Director of the United States Patent and Trademark Office*